United States Patent [19]

Lawson et al.

[11] 4,129,331

[45] Dec. 12, 1978

[54] RETRACTABLE COVER FOR OPEN TOP CONTAINER

[76] Inventors: Herman L. Lawson, 664 Coolidge, Plymouth, Mich. 48170; Norbert D. Lang, 4640 Hunt, Wayne, Mich. 48184

[21] Appl. No.: 825,217

[22] Filed: Aug. 17, 1977

Related U.S. Application Data

[63] Continuation of Ser. No. 732,960, Oct. 15, 1976.

[51] Int. Cl.² ............................................. B60P 7/04
[52] U.S. Cl. .................................. 296/100; 160/84 R
[58] Field of Search .............. 296/100, 137 C; 52/63; 160/84 R

[56] References Cited

U.S. PATENT DOCUMENTS

| | | | |
|---|---|---|---|
| 3,138,399 | 6/1964 | Hughes | 296/100 |
| 3,656,802 | 4/1972 | White | 296/100 |
| 3,829,154 | 8/1974 | Becknell | 296/100 |
| 3,975,047 | 8/1976 | McClellan | 296/100 |

Primary Examiner—Robert R. Song
Attorney, Agent, or Firm—Charles W. Chandler

[57] ABSTRACT

A flexible cover for an open top trailer is so mounted as to be moved by pneumatic power means between a closed position and an open position in which the cover is retracted toward a position adjacent one side of the trailer so as to be generally pleated by a system of rubber ropes.

3 Claims, 8 Drawing Figures

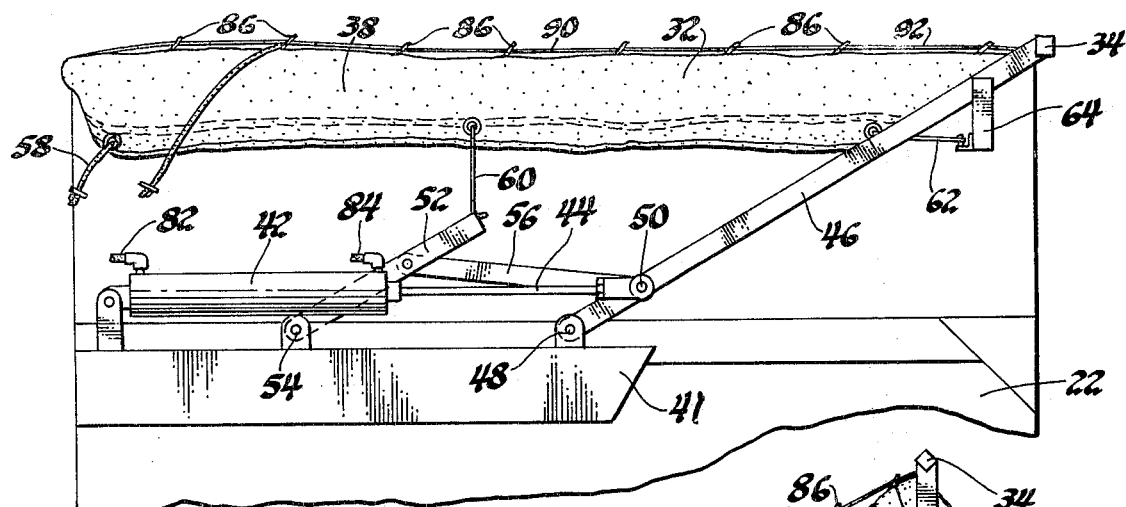
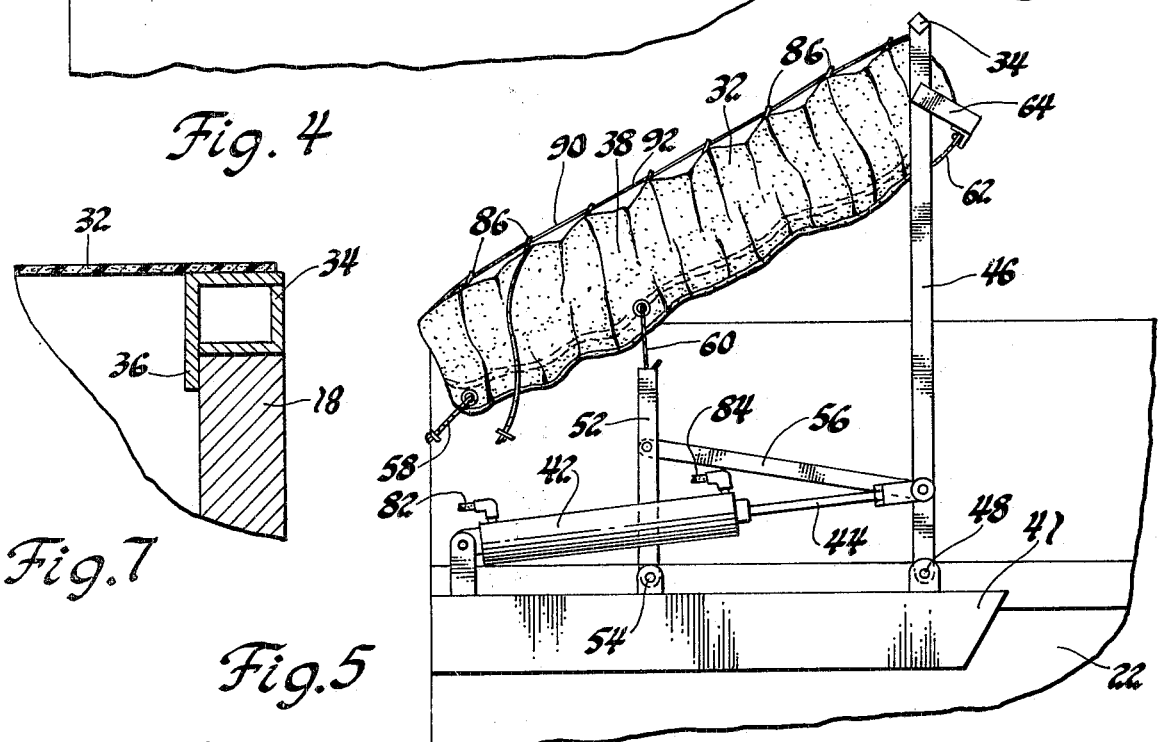
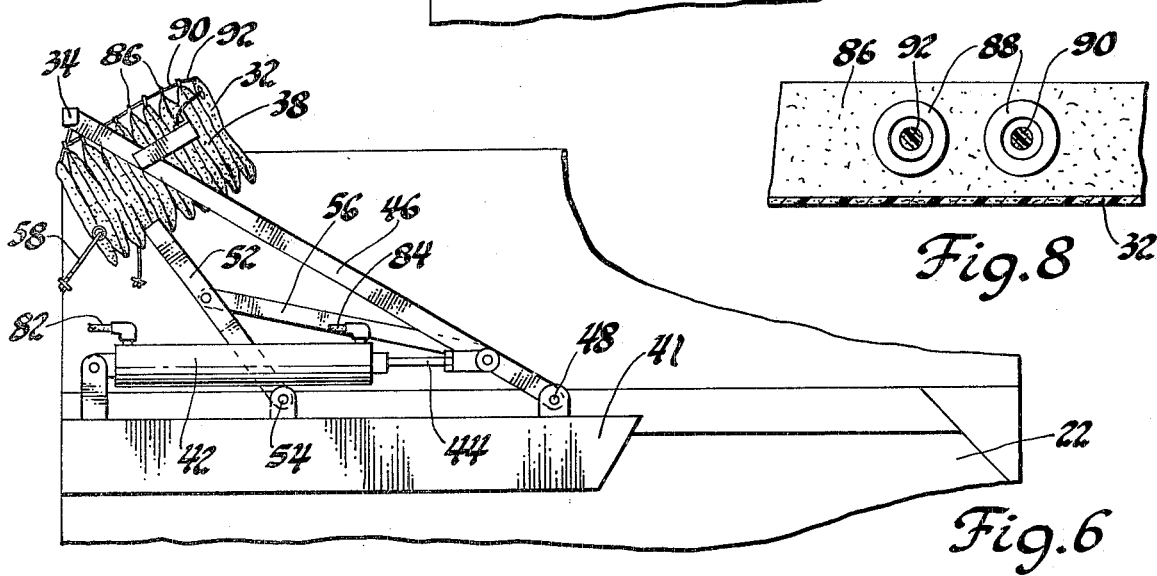
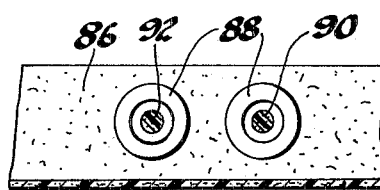

4,129,331

RETRACTABLE COVER FOR OPEN TOP CONTAINER

CROSS REFERENCE TO RELATED APPLICATION

This is a continuation of application Ser. No. 732,960 filed Oct. 15, 1976.

BACKGROUND OF THE INVENTION

This invention is related to power-operated covers for open topped containers such as trailers, and more particularly to such a cover having a network of resilient ropes for folding the cover into a pleated position as it is being retracted to open the top of the trailer.

Large open-top trailers are employed for transporting materials that are received into the trailer through its open top. It is desireable to cover the top of such trailers for a variety of reasons. For example, some materials tend to bounce out of the trailer onto the highway. Other materials, such as asphalt, must be kept in a heated condition which can best be done by covering the trailer top with a flexible cover.

Some trailers are substantial in size so that it is difficult to manually manipulate the cover between its open and closed positions. The prior art discloses various power means for assisting the user, usually by winding the cover on a reel. Such prior art devices have received very little commercial acceptance.

SUMMARY OF THE INVENTION

The broad purpose of the present invention is to provide a flexible cover for an open-top vehicle that can be reliably moved between its open and closed positions by operating a control lever in the cab of the truck connected to the trailer. In the preferred embodiment of the invention, the cover has one side connected along one side of the trailer and its opposite side connected to a frame which is movable between opposite sides of the trailer. Pneumatic power means connected to the frame are operable to move the cover and the frame between its open and closed positions. A network of resilient ropes are connected between the trailer and the frame in such a manner that as the frame is being moved towards its open position, the cover, through a series of tabs which are slidably mounted on the ropes, is folded into a generally pleated condition.

The preferred embodiment has been mounted on a forty-foot trailer having a thirty-five foot opening so that the operator can quickly open and close the trailer top without having to manipulate the cover by hand.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which:

FIG. 4 is an end view of the trailer of FIG. 1 showing the frame in its closed position;

FIG. 5 is a view similar to FIG. 4 but showing the frame in a partially open position;

FIG. 6 is a view similar to FIG. 4 but showing the frame in its open position;

FIG. 7 is a view taken along lines 7—7 of FIG. 3; and

FIG. 8 is an enlarged view of a typical tab, taken along lines 8—8 of FIG. 3.

DESCRIPTION OF THE PREFERRED EMBODIMENT

Figure 1:
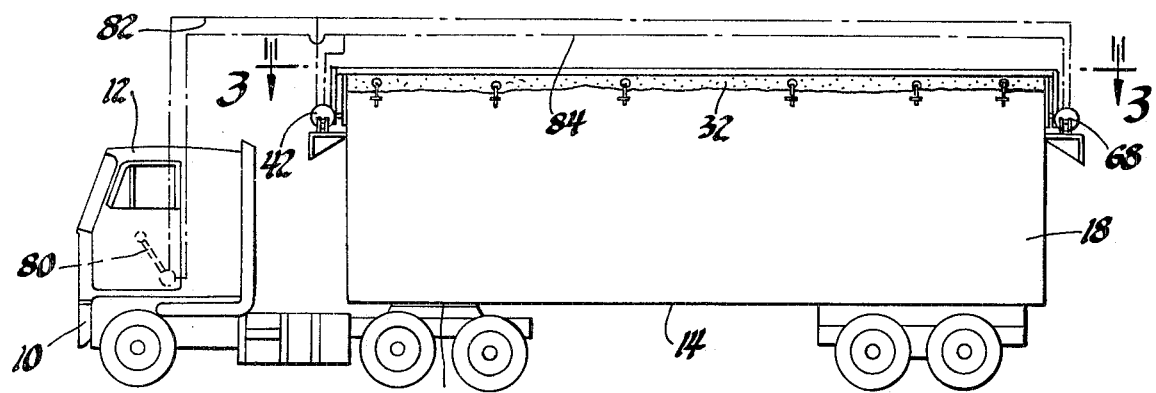
FIG. 1 is a side view of a tractor-trailer combination employing the preferred embodiment of the invention in which the pneumatic power system is illustrated schematically.
Figure 3:
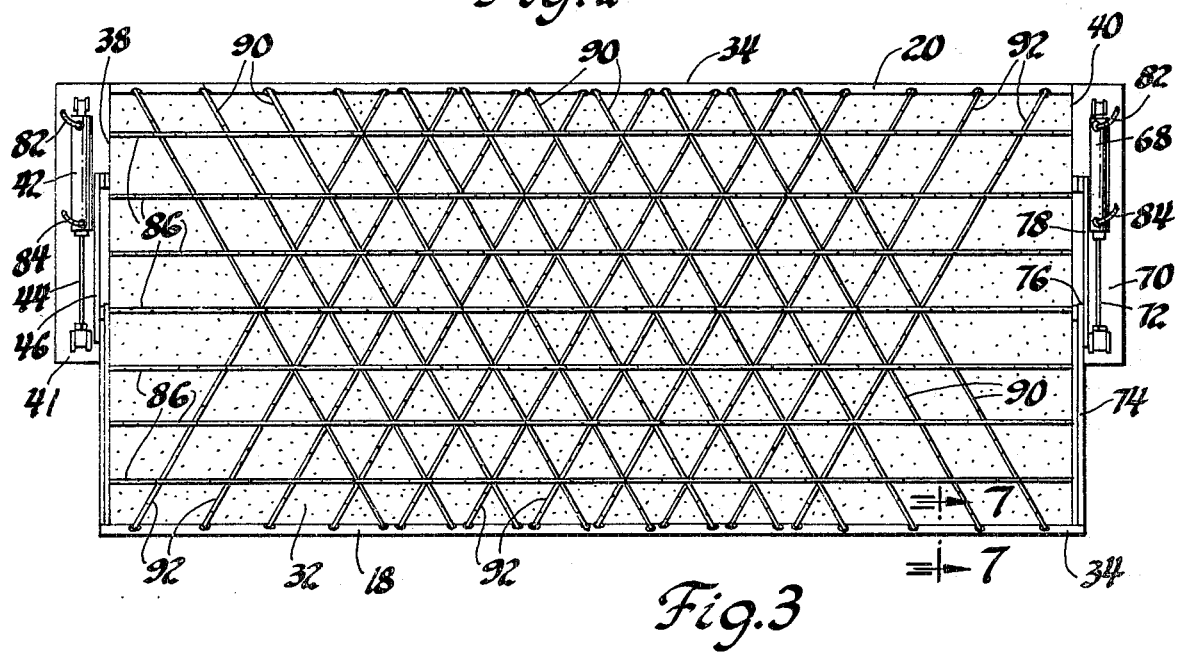
FIG. 3 is an enlarged view taken along lines 3—3 of FIG. 1 showing the cover in its closed position.

Referring to the drawings, FIGS. 1 and 3 illustrate a conventional tractor having a cab 12 for the operator. A multi-wheeled trailer 14 is connected to the tractor by conventional fifth wheel means 16.

Referring to FIG. 3, trailer 14 has a sidewall 18, a sidewall 20, and end walls 22 and 24 connected to opposite ends of the sidewalls to form a container having a bottom 26 for receiving material (not shown) through an open top 28. A plurality 30 of fixed, parallel tubular supports are connected between sides 18 and 20 adjacent open top 28.

Figure 2:
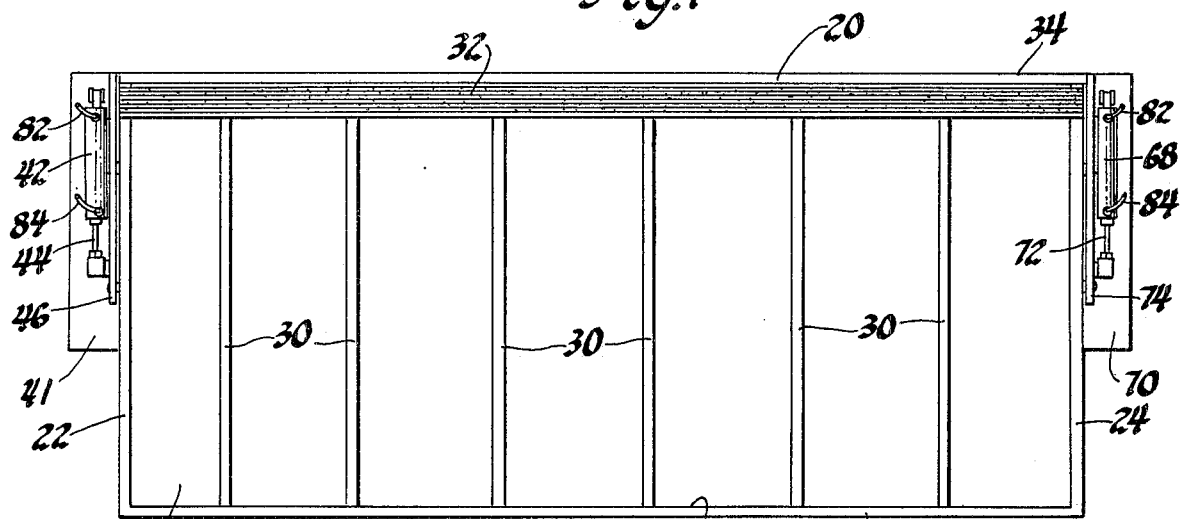
FIG. 2 is a plan view of the trailer of FIG. 1 showing the cover in its open position.

Referring to FIGS. 2 and 3, a flexible cover 32 is mounted on trailer 14. Cover 32 has a length accomodating the length of the trailer and a width accomodating the width of the trailer, one side of the cover being connected to sidewall 20.

An elongated frame 34 is connected to the opposite side of the cover. Frame 34 is slightly longer than the length of sidewall 20 and has a lip 36 for locating the frame on the top edge of sidewall 18 as is best illustrated in FIG. 7. Cover 32 has a flap 38 which extends over the top of end wall 22 and a second flap 40 which extends over the top of end wall 24.

Frame 34 and cover 32 are movable between a closed position illustrated in FIG. 4 in which the cover encloses the contents of the trailer, and an open position illustrated in FIG. 6 in which the cover exposes the open top of the trailer. Referring to FIGS. 3 and 4, a platform 41 is mounted on end wall 22. A pneumatic device 42 having a movable power-operated piston rod 44 is mounted on platform 41. Rod 44 is movable between an extended position illustrated in FIG. 4 and a retracted position illustrated in FIG. 6 in a manner well known to those skilled in the art.

A lever 46 has one end connected by pivot means 48 to platform 41 and its opposite end connected to frame 34. Rod 44 is pivotally connected by means 50 to lever 46. Lever 46 is so connected to rod 44 that when the rod is in its extended position, illustrated in FIG. 4, frame 34 is seated on the top of sidewall 18. When rod 44 is retracted as illustrated in FIG. 6, the lever supports frame 34 adjacent sidewall 20.

A second lever 52 is connected by pivot means 54 to platform 41. As best shown in FIGS. 5 and 6, a link 56 has one end connected to lever 52 and its opposite end connected to lever 46 so that the two levers move together as rod 44 is being retracted.

A resilient rubber rope 58 connects one corner of flap 38 to end wall 22. A second resilient rubber rope 60 connects the mid-section of flap 38 to lever 52. A third rubber rope 62 connects the other corner of flap 38 to an arm 64 attached to lever 46. The arrangement is such that as lever 46 is being moved toward its closed position, the two levers are connected to flap 38 to pull it down over the top edge of end wall 22. Similarly, as pneumatic device 42 is being retracted, lever 52 and lever 46 raise and move flap 38 towards its retracted position adjacent sidewall 20, as illustrated in FIGS. 2 and 6.

Referring to FIG. 3, a second pneumatic cylinder 68 is mounted on platform 70 which is attached to end wall 24 to assist pneumatic cylinder 42 in moving cover 32. Pneumatic cylinder 68 has an extendable piston rod 72 pivotally connected to lever 74 by means 76. The lower end of lever 74 is connected to platform 70 and its upper end is attached to frame 34. A short lever 76 is connected by link 78 to lever 74 so that the two levers cooperate by resilient connections to flap 40 to pull it down over end wall 24 as the frame is being moved towards its closed position. Thus it is to be understood that the arrangement between power means 68 and flap 40 is similar to the arrangement between pneumatic power means 42 and flap 38.

Referring to FIG. 1, both cylinders 42 and 68 are actuated by a handle 80 mounted in cab 12 of the truck which opens a connection from a source of air under pressure (not shown) to a fluid conduit 82 which is connected to each of the cylinders 42 and 68 to cause their respective rods to move towards their fully extended position, and a fluid conduit 84 which is connected to the opposite end of the two pneumatic devices to bias their respective rods toward their retracted positions.

Now referring to FIGS. 3 and 4, a plurality of tabs 86 are attached to the top side of cover 32 parallel to sidewalls 18 and 20. A typical tab is illustrated in FIG. 8. Each tab supports a series of eyes arranged in pairs 88 along the length of the tab. The eyes are mounted adjacent to one another.

Now referring to FIG. 3, a plurality of parallel resilient rubber ropes 90 are mounted parallel to one another in an angular relationship between sidewalls 18 and 20. When cover 32 is disposed in its closed position, each rubber rope has one end connected to the top of sidewall 20 and its opposite end connected to frame 32.

A second plurality of parallel, rubber ropes 92 are connected between sidewall 20 and frame 34 at an angular relationship between the two sides. It is to be noted that rubber ropes 92 form an acute angle with frame 34 that opens in the opposite direction with respect to the angle formed by each of rubber ropes 90.

Referring to FIG. 8, each rubber rope 90 is received in an eye carried by each of the tabs 86. Similarly, each rubber rope 92 is carried by an eye 88 of each of the tabs 86 so that as the cover 32 is being moved from its closed position towards its open position, the tabs 86 slidably move along the two series of rubber ropes. As the cover is moved from its fully retracted position in FIG. 2, the tabs move to a position adjacent one another so that the cover tends to fold into a generally pleated condition.

It is to be noted that each of the rubber ropes 90 and 92 is in a condition of tension when the cover is in its closed position. The rubber ropes are disposed in an acute angular position with respect to frame 34 so that when the frame 34 is disposed in its open position, each rubber rope is still in a condition of tension biasing frame 34 toward sidewall 20 even though the frame is adjacent the sidewall. Because the rubber ropes are always in a condition of tension, the tabs attached to the cover slide along the rubber ropes as the cover is being moved either toward its open or its closed position.

In operation, the user moves handle 80 to one position which causes pneumatic devices 42 and 68 to move the frame and cover 32 towards its closed position. To open the cover, the user moves the handle toward its alternate position to cause the pneumatic device to move the cover toward its fully open position. In its fully closed position, the entire top opening of the trailer is enclosed between the two sidewalls while flaps 38 and 40 extend over the end walls to fully enclose the contents of the trailer.

Having described our invention, we claim:

1. In combination with a vehicular container having a first sidewall, a second sidewall spaced with respect to the first sidewall, and a pair of end walls cooperating with the sidewalls to define an open top, cover means comprising:

a cover of flexible material having a width accomodating the distance between said container sidewalls, and a length accomodating the distance between the container end walls, and means connecting one side of the cover to the first sidewall;

an elongated substantially rigid support member connected to the opposite side of the cover so as to be movable therewith between an open position adjacent the first sidewall, and a closed position adjacent the second sidewall, the support being mounted on the container in a position parallel to the first sidewall;

power means connected to the support for moving it between said open position and said closed position;

a plurality of parallel first resilient ropes disposed at spaced positions along said support, each rope having one end connected to the first sidewall so as to be fixed against motion thereto and its opposite end connected to the support so as to form an acute angle therewith at such times as the support is disposed in said closed position;

a plurality of parallel second resilient ropes disposed at spaced positions along said support, each rope having one end connected to the first sidewall so as to be fixed against motion thereto and its opposite end connected to the support, each of said second ropes being disposed to form an acute angle with respect to the support so as to cross the first ropes at such times as the support is in said closed position;

said first resilient ropes and said second resilient ropes each being in a state of tension whereby as the support is being moved from the second sidewall toward the first sidewall, the tension of said first and second resilient ropes is reduced as the distance between the support and the first sidewall; and eye means mounted on the cover between the support and the first sidewall, the eye means receiving the plurality of first ropes and the plurality of second ropes such that as the support is being moved by the power means from said closed position toward said open position, the flexible cover is moved from a substantially planar position toward a substantially pleated position.

2. A combination as defined in claim 1, in which said first and second resilient ropes are disposed substantially parallel to the first sidewall at such times as the support is in said open position.

3. In combination with a wheeled container having a first sidewall, a second sidewall spaced with respect to the first sidewall, and a pair of end walls cooperating with the sidewalls to define an open top, cover means comprising:

a cover of flexible material having a width accomodating the distance between said container sidewalls, and a length accomodating the distance between the container end walls, and means connecting one side of the cover to the first sidewall;

an elongated substantially rigid support member connected to the opposite side of the cover so as to be movable therewith between an open position adjacent the first sidewall, and a closed position adjacent the second sidewall;

power means connected to the support for moving it between said open position and said closed position;

a first resilient rope having one end connected to the first sidewall so as to be fixed against motion thereto and its opposite end connected to the support to bias it toward one of the end walls;

a second resilient rope having one end connected to the first sidewall so as to be fixed against motion thereto, the opposite end of the second rope being connected to the support to bias it toward the opposite end wall, said second rope being disposed to cross the first rope at such times as the support is in said closed position;

said first resilient rope and said second resilient rope each being in a state of tension whereby as the support is being moved from the second sidewall toward the first sidewall, the tension of said first rope and said second rope is reduced according to the distance between the support and the first sidewall; and eye means mounted on the cover between the support and the first sidewall, the eye means receiving the first rope and the second rope such tht as the support is being moved by the power means from said closed position toward said open position, the flexible cover is moved from a position in which it spans said container sidewalls toward a position in which it is disposed adjacent the first sidewall.

* * * * *